(12) United States Patent
Gormley

(10) Patent No.: US 11,639,686 B2
(45) Date of Patent: May 2, 2023

(54) AIRCRAFT PROPULSION SYSTEM WITH VARIABLE AREA INLET ASSEMBLY

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 157 days.

(21) Appl. No.: 17/159,343

(22) Filed: Jan. 27, 2021

(65) Prior Publication Data
US 2022/0235700 A1 Jul. 28, 2022

(51) Int. Cl.
*F02C 7/042* (2006.01)
*B64D 33/02* (2006.01)

(52) U.S. Cl.
CPC .............. *F02C 7/042* (2013.01); *B64D 33/02* (2013.01)

(58) Field of Classification Search
CPC ................................ F02C 7/042; B64D 33/02
See application file for complete search history.

(56) References Cited

U.S. PATENT DOCUMENTS

| | | | |
|---|---|---|---|
| 2,876,621 A | 3/1959 | Bogert | |
| 2,970,431 A * | 2/1961 | Harshman | ............... F02C 7/042 137/15.1 |
| 3,069,842 A * | 12/1962 | Price | ....................... F02C 7/042 138/46 |
| 3,199,810 A | 8/1965 | Stroud | |
| 3,664,612 A | 5/1972 | Skidmore | |
| 4,132,240 A | 1/1979 | Frantz | |
| 5,105,615 A * | 4/1992 | Herzog | ................... F02C 7/042 60/803 |
| 6,276,632 B1 | 8/2001 | Sanders | |
| 6,793,175 B1 | 9/2004 | Sanders | |
| 8,690,097 B1 | 4/2014 | Huynh | |
| 10,107,196 B2 | 10/2018 | Devine | |
| 2013/0284279 A1 | 10/2013 | Richards | |
| 2017/0175766 A1 | 6/2017 | Ali | |

OTHER PUBLICATIONS

EP search report for EP22153739.2 dated Jun. 1, 2022.

* cited by examiner

*Primary Examiner* — Lorne E Meade
(74) *Attorney, Agent, or Firm* — Getz Balich LLC

(57) ABSTRACT

An assembly is provided for an aircraft propulsion system. This assembly includes a center body, a scarfed inlet structure and an inlet passage. The scarfed inlet structure extends circumferentially about the center body. The inlet passage is radially between and formed by at least the center body and the scarfed inlet structure. A first component of the assembly is configured to rotate about an axis relative to a second component of the assembly between: (A) a first position where a metering portion of the inlet passage has a first area; and (B) a second position where the metering portion has a second area. The first component is one of the center body or the scarfed inlet structure, and the second component is the other one of the center body or the scarfed inlet structure.

19 Claims, 6 Drawing Sheets

AIRCRAFT PROPULSION SYSTEM WITH VARIABLE AREA INLET ASSEMBLY

BACKGROUND

1. Technical Field

This disclosure relates generally to an aircraft propulsion system and, more particularly, to an inlet assembly for the aircraft propulsion system with a variable airflow inlet area.

2. Background Information

An aircraft propulsion system includes an inlet structure and a gas turbine engine. The inlet structure directs air into the gas turbine engine. Some known inlet structures include a variable airflow inlet area for tailoring a mass flow of the air entering the gas turbine engine. While these known inlet structures have various advantages, there is still room in the art for improvement. There is a need in the art therefore for an improved inlet assembly with a variable airflow inlet area.

SUMMARY OF THE DISCLOSURE

According to an aspect of the present disclosure, an assembly is provided for an aircraft propulsion system. This assembly includes a center body, a scarfed inlet structure and an inlet passage. The scarfed inlet structure extends circumferentially about the center body. The inlet passage is radially between and formed by at least the center body and the scarfed inlet structure. The inlet passage includes a metering portion. A first component of the assembly is configured to rotate about an axis relative to a second component of the assembly between: (A) a first position where the metering portion has a first area; and (B) a second position where the metering portion has a second area that is different than the first area. The first component is configured as or otherwise includes one of the center body or the scarfed inlet structure. The second component is configured as or otherwise includes the other one of the center body or the scarfed inlet structure.

According to another aspect of the present disclosure, another assembly is provided for an aircraft propulsion system. This assembly includes a center body, a nacelle inlet structure and an inlet passage. The center body includes a center body surface with a trailing edge. The nacelle inlet structure extends circumferentially around the center body. The nacelle inlet structure has a leading edge. The inlet passage is radially between and formed by at least the center body and the nacelle inlet structure. The inlet passage includes a metering portion. A first component of the assembly is configured to rotate about an axis relative to a second component of the assembly between: (A) a first position where the metering portion has a first area, and where the trailing edge is axially displaced from the leading edge by a first distance; and (B) a second position where the metering portion has a second area that is different than the first area, and where the trailing edge is axially displaced from the leading edge by a second distance that is different than the first distance. The first component of the assembly is configured as or otherwise includes a first of the center body or the nacelle inlet structure. The second component of the assembly is configured as or otherwise includes a second of the center body or the nacelle inlet structure.

According to still another aspect of the present disclosure, another assembly is provided for an aircraft propulsion system. This assembly includes a double tapered center body, a nacelle inlet structure and an inlet passage. The nacelle inlet structure extends circumferentially around the double tapered center body. The inlet passage is radially between and formed by at least the double tapered center body and the nacelle inlet structure. The inlet passage includes a metering portion. A first component of the assembly is configured to rotate about an axis relative to a second component of the assembly between: (A) a first position where the metering portion has a first area; and (B) a second position where the metering portion has a second area that is different than the first area. The first component of the assembly is configured as or otherwise includes one of the double tapered center body or the nacelle inlet structure. The second component of the assembly is configured as or otherwise includes the other one of the double tapered center body or the nacelle inlet structure.

The nacelle inlet structure may be configured as or otherwise include as a scarfed inlet structure.

The nacelle inlet structure may be configured as or otherwise include a scarfed inlet lip.

The center body may also include a first tubular surface adjacent the center body surface. The first tubular surface may taper radially inwards towards the axis as the center body extends in a first direction along the axis away from the center body surface.

The center body may also include a second tubular surface adjacent the center body surface. The second tubular surface may taper radially inwards towards the axis as the center body extends in a second direction along the axis away from the center body surface.

The first component of the assembly may be configured as or otherwise include the center body. The second component of the assembly may be configured as or otherwise include the scarfed inlet structure.

The scarfed inlet structure may have a leading edge. A first point on the leading edge may be axially displaced from a second point on the leading edge along the axis.

A plane of an inlet orifice to the inlet opening passage may be angularly offset from the axis.

The center body may include a tubular surface that radially tapers as center body extends in a forward direction along the axis.

The center body may include a tubular surface that radially tapers as center body extends in an aft direction along the axis.

The center body may include a first tapered surface, a second tapered surface and a plateau surface. The plateau surface may extend axially between the first tapered surface and the second tapered surface.

The metering portion may have an inner peripheral boundary. The inner peripheral boundary may be formed by the plateau surface when the first component of the assembly is in the first position. The inner peripheral boundary may be formed by the plateau surface and the second tapered surface when the first component of the assembly is in the second position.

The center body may include a plateau surface aligned with an inlet lip of the scarfed inlet structure. A trailing edge of the plateau surface may have a scarfed configuration.

The center body may include a plateau surface with a trailing edge. A first point on the trailing edge may be axially displaced from a second point on the trailing edge along the axis.

The scarfed inlet structure may include a leading edge. The center body may include a plateau surface with a trailing edge. The trailing edge may be separated from the leading edge by a first axial distance along the axis when the first component of the assembly is in the first position. The trailing edge may be separated from the leading edge by a second axial distance along the axis when the first component of the assembly is in the second position. The second axial distance may be different than the first axial distance.

The center body may include a cylindrical surface with an axial length that changes as the cylindrical surface extends circumferentially about the axis.

The axis may be coaxial with a centerline of the aircraft propulsion system.

The axis may be offset from a centerline of the aircraft propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
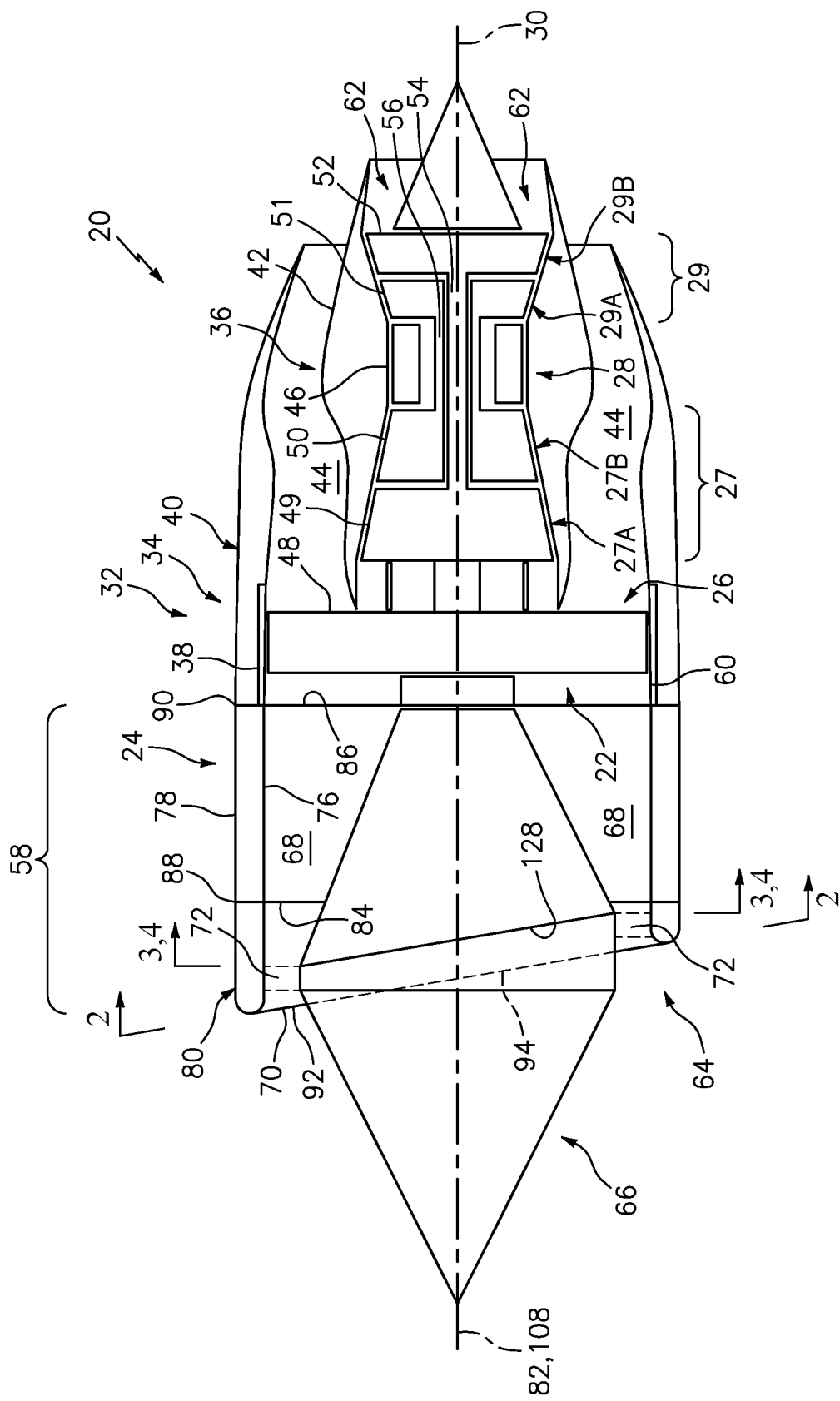
FIG. 1 is a schematic side sectional illustration of an aircraft propulsion system with a variable area inlet assembly in a first position.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case) and an outer structure 40 of the nacelle 24; i.e., an outer nacelle structure. The outer case 38 houses at least the fan section 26. The outer nacelle structure 40 houses and provides an aerodynamic cover for the outer case 38. The outer nacelle structure 40 also covers a portion of an inner structure 42 of the nacelle 24; i.e., an inner nacelle structure, which may also be referred to as an inner fixed structure (IFS). More particularly, the outer nacelle structure 40 axially overlaps and extends circumferentially about (e.g., completely around) the inner nacelle structure 42. The outer nacelle structure 40 and the inner nacelle structure 42 thereby at least partially or completely form a bypass flow path 44 within the aircraft propulsion system 20.

The inner housing structure 36 includes an inner case 46 (e.g., a core case) and the inner nacelle structure 42. The inner case 46 houses one or more of the engine sections 27A-29B, which engine sections 27A-29B may be collectively referred to as an engine core. The inner nacelle structure 42 houses and provides an aerodynamic cover for the inner case 46.

Each of the engine sections 26, 27A, 27B, 29A and 29B includes a bladed rotor 48-52. The fan rotor 48 and the LPC rotor 49 are connected to and driven by the LPT rotor 52 through a low speed shaft 54. The HPC rotor 50 is connected to and driven by the HPT rotor 51 through a high speed shaft 56. The shafts 54 and 56 are rotatably supported by a plurality of bearings (not shown). Each of these bearings is connected to the aircraft propulsion system housing 32 (e.g., the inner case 46) by at least one stationary structure such as, for example, an annular support strut.

During operation, air enters the aircraft propulsion system 20 through an inlet structure 58 of the outer nacelle structure 40; i.e., a nacelle inlet structure. This air is directed through a duct 60 (e.g., a fan duct in the fan section 26) and into a core flow path 62 and the bypass flow path 44. The core flow path 62 extends axially along the axial centerline 30 within the aircraft propulsion system 20, through the engine sections 27A-29B, to a core nozzle outlet, where the core flow path 62 is radially within the inner case 46. The bypass flow path 44 extends axially along the axial centerline 30 within the aircraft propulsion system 20 to a bypass nozzle outlet, where the bypass flow path 44 is radially between the outer nacelle structure 40 and the inner nacelle structure 42. The air within the core flow path 62 may be referred to as "core air". The air within the bypass flow path 44 may be referred to as "bypass air".

The core air is compressed by the compressor rotors 49 and 50 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 51 and 52 to rotate. The rotation of the turbine rotors 51 and 52 respectively drive rotation of the compressor rotors 50 and 49 and, thus, compression of the air received from a core airflow inlet. The rotation of the LPT rotor 52 also drives rotation of the fan rotor 48, which propels bypass air through and out of the bypass flow path 44. The propulsion of the bypass air may account for a majority of thrust generated by the turbine engine 22. The aircraft propulsion system 20 of the present disclosure, however, is not limited to the exemplary gas turbine engine configuration described above.

Optimal mass flow requirements of the air entering the aircraft propulsion system 20 through the nacelle inlet structure 58 may change depending upon one or more parameters. These parameters may include, but are not limited to, modes of operation, aircraft maneuvers and operating conditions. For example, where the aircraft flies at supersonic speeds, the nacelle inlet structure 58 may be configured to direct a first mass flow of the air into the aircraft propulsion system 20. When the aircraft flies at subsonic speeds, the nacelle inlet structure 58 may be configured to direct a second mass flow of the air into the aircraft propulsion system 20, where the second mass flow is greater than the first mass flow.

To accommodate changing mass flows, the aircraft propulsion system 20 of FIG. 1 includes a variable area inlet assembly 64. The variable area inlet assembly 64 of FIGS. 1 and 2 includes at least the nacelle inlet structure 58 and a center body 66; e.g., an inlet cone or an inlet spike. At least these variable area inlet assembly components 58 and 66 collectively form an annular inlet duct, which inlet duct forms an inlet passage 68 into and within the aircraft propulsion system 20. Referring to FIG. 1, the inlet duct and its inlet passage 68 extend axially along the axial centerline 30 from an inlet orifice 70 of the inlet passage 68 to the fan duct 60. The inlet passage 68 of FIG. 1 includes a metering portion 72; e.g., a choke point. The term "metering portion" may describe a portion of the inlet passage 68 with the smallest cross-sectional flow area.

Figure 3:
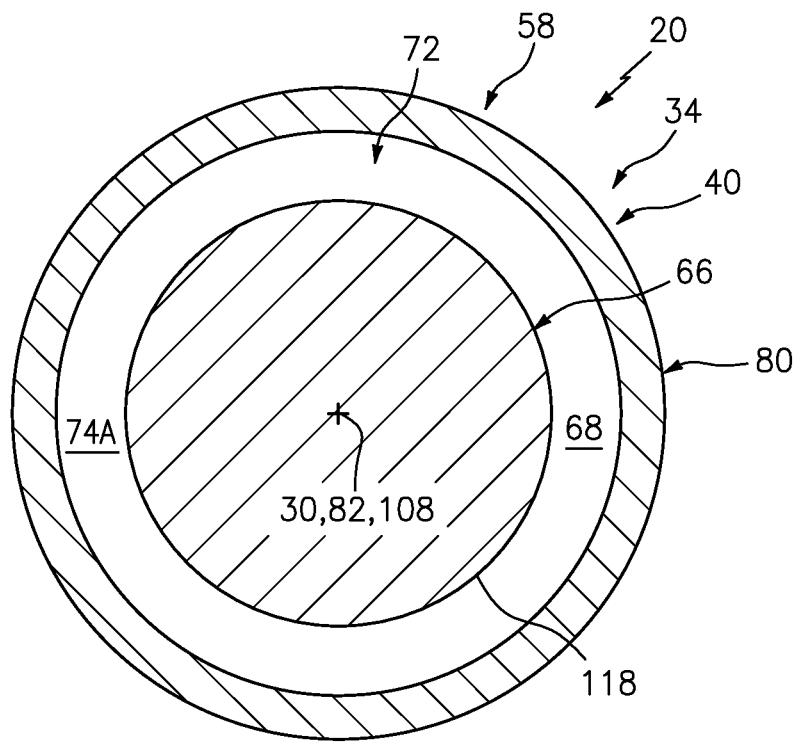
FIG. 3 is a cross-sectional illustration of the variable area inlet assembly in the first position taken along line 3-3 in FIG. 1.
Figure 4:
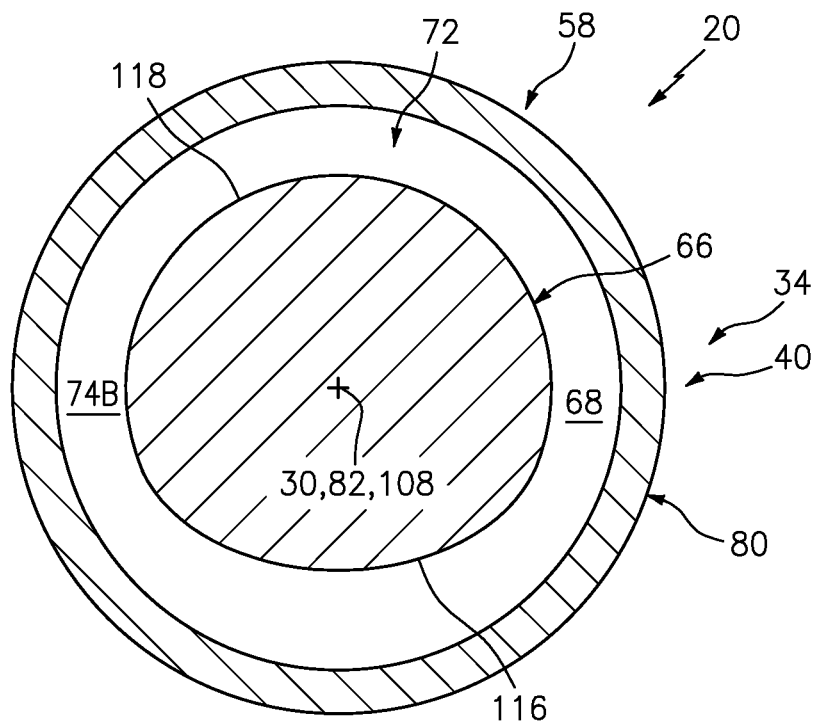
FIG. 4 is a cross-sectional illustration of the variable area inlet assembly in a second position taken along line 4-4 in FIG. 1.

The variable area inlet assembly 64 is configured to provide a variable airflow inlet area. More particularly, at least the variable area inlet assembly components 58 and 66 are configured to provide the metering portion 72 of the inlet passage 68 with a variable cross-sectional area. Referring to FIG. 3 for example, during a first (e.g., supersonic) mode of operation, at least one of the variable area inlet assembly components 58 and 66 is configured in/moves (e.g., rotates) to a first position; e.g., a fully closed position. In this first position, the metering portion 72 has a first area 74A; e.g., a cross-sectional area in the plane of FIG. 3. Referring to FIG. 4, during a second (e.g., subsonic) mode of operation, the at least one of the variable area inlet assembly components 58 and 66 is configured in/moves (e.g., rotates) to a second position; e.g., a fully open position. In this second position, the metering portion 72 has a second area 74B; e.g., a cross-sectional area in the plane of FIG. 4. The second area 74B is different (e.g., greater) than the first area 74A.

Referring to FIG. 1, the nacelle inlet structure 58 is disposed at a forward, upstream end of the nacelle 24. The nacelle inlet structure 58 may be configured as a stationary and/or scarfed inlet structure. The nacelle inlet structure 58 of FIG. 1 includes a tubular inner barrel 76, a tubular outer barrel 78 and an annular scarfed inlet lip 80.

The inner barrel 76 extends circumferentially about (e.g., completely around) an axial centerline 82 (e.g., an axis) of the variable area inlet assembly 64, which centerline 82 may be coaxial with the axial centerline 30. The inner barrel 76 extends axially along the axial centerline 30, 82 between a first (e.g., forward, upstream) end 84 of the inner barrel 76 and a second (e.g., aft, downstream) end 86 of the inner barrel 76. The inner barrel second end 86 of FIG. 1 is connected to a (e.g., forward, upstream) end of the outer case 38. The inner barrel 76 may be configured to attenuate noise generated during aircraft propulsion system operation and, more particularly for example, noise generated by rotation of the fan rotor 48. The inner barrel 76, for example, may include at least one tubular noise attenuating acoustic panel or a circumferential array of arcuate noise attenuating acoustic panels arranged around the axial centerline. The present disclosure, however, is not limited to such an acoustic inner barrel configuration.

The outer barrel 78 extends circumferentially about (e.g., completely around) the axial centerline 30, 82. The outer barrel 78 extends axially along the axial centerline 30, 82 between a first (e.g., forward, upstream) end 88 of the outer barrel 78 and a second (e.g., aft, downstream) end 90 of the outer barrel 78. The outer barrel second end 90 of FIG. 1 is disposed next to respective (e.g., forward, upstream) ends of a pair of fan cowls (one visible in FIG. 1) of the outer nacelle structure 40.

Figure 5:
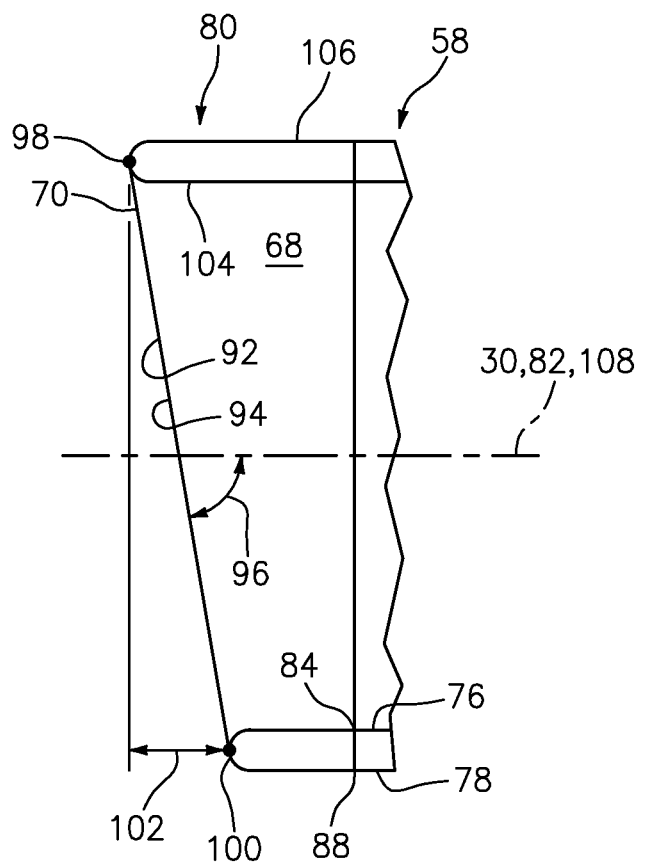
FIG. 5 is a side sectional illustration of a forward, upstream portion of a nacelle inlet structure of the variable area inlet assembly.

Referring to FIG. 5, the inlet lip 80 forms a leading edge 92 of the nacelle 24 as well as an outer peripheral boundary of the inlet orifice 70 and a forward, upstream portion of the inlet passage 68. A flat plane 94 defined by at least three points along (or an entirety of) the nacelle leading edge 92 (see plane of FIG. 2) is angularly offset from the axial centerline 30, 82 by an angle 96; e.g., an acute angle. With this arrangement, a first point 98 (e.g., one of the at least three points) on the nacelle leading edge 92 is axially displaced from a second point 100 (e.g., another one of the at least three points) on the nacelle leading edge 92 by a non-zero axial distance 102. The first point 98 of FIG. 5 may be a forwardmost, upstream-most point along the nacelle leading edge 92 located at, for example, a gravitational top of the aircraft propulsion system 20. The second point 100 of FIG. 5 may be an aftmost, downstream-most point along the nacelle leading edge 92 and/or diametrically opposed to the first point 98 located at, for example, a gravitational bottom of the aircraft propulsion system 20. The present disclosure, however, is not limited to such an exemplary inlet lip configuration. For example, in other embodiments, the first point 98 and/or the second point 100 may be respectively located along opposing sides of the aircraft propulsion system 20. Furthermore, while the first point 98 may be the only forwardmost, upstream-most point along the nacelle leading edge 92 and/or the second point 100 may be the only aftmost, downstream-most point along the nacelle leading edge 92, the present disclosure is not limited to such an exemplary configuration. The nacelle leading edge 92, for example, may alternatively have an undulating (e.g., wavy) geometry.

The inlet lip 80 of FIG. 5 has a cupped (e.g., a generally U-shaped or V-shaped) side sectional geometry. The inlet lip 80 and its cupped side sectional geometry extend circumferentially about (e.g., completely around) the axial centerline 30, 82; see also FIG. 2. The inlet lip 80 of FIG. 5, for example, includes axially overlapping inner and outer lip portions 104 and 106. The inner lip portion 104 is connected to and may be integral with the outer lip portion 106 at and along the nacelle leading edge 92. An (e.g., aft, downstream) end of the inner lip portion 104 is axially adjacent and/or connected to the inner barrel first end 84. An (e.g., aft, downstream) end of the outer lip portion 106 is axially adjacent and/or connected to the outer barrel first end 88.

Figure 6:
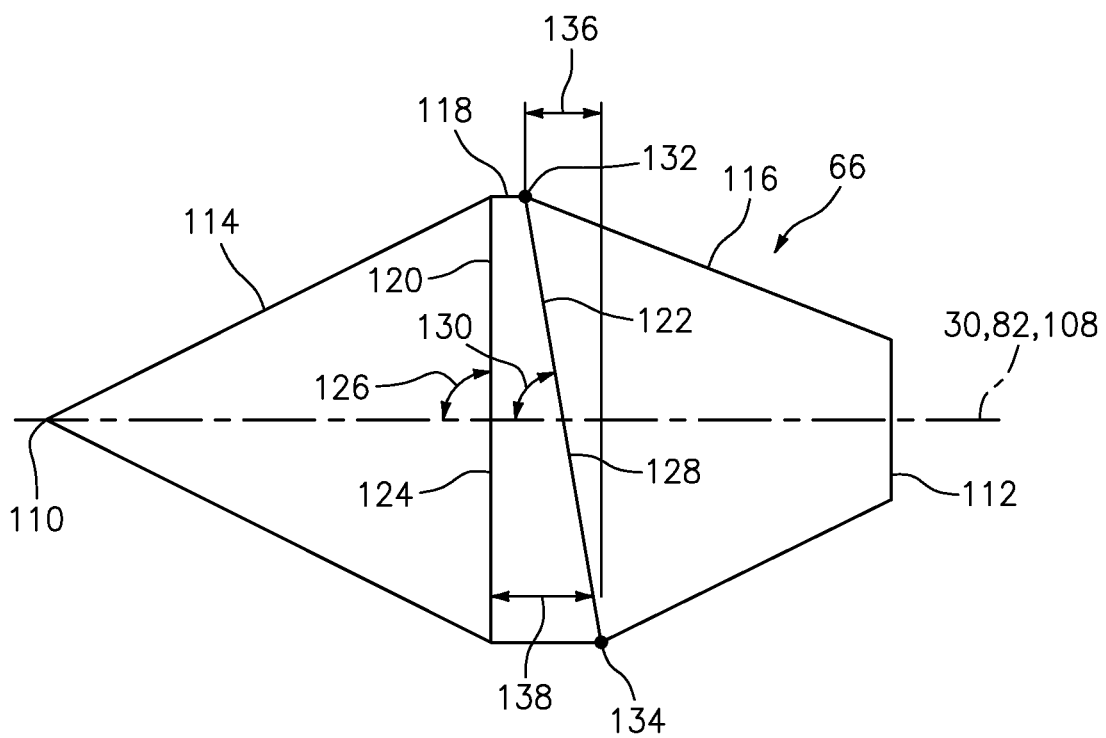
FIG. 6 is a side sectional illustration of a center body of the nacelle inlet structure.

Referring to FIG. 6, the center body 66 may be configured as a double tapered center body. The center body 66 of FIG. 6, for example, has a double tapered exterior skin that extends circumferentially about (e.g., completely around) an axial centerline 108 (e.g., a rotational axis) of the center body 66, which centerline 108 may be coaxial with the axial centerline 30, 82 (see also FIG. 2). The center body 66 and its exterior surface extend axially along the axial centerline 30, 82, 108 from a first (e.g., forward, upstream) end 110 of the center body 66 to a second (e.g., aft, downstream) end 112 of the center body 66. The exterior skin of FIG. 6 includes a first (e.g., forward, upstream) surface 114, a second (e.g., aft, downstream) surface 116 and a (e.g., intermediate) plateau surface 118.

The first surface 114 may be a tapered and/or tubular surface. The first surface 114 of FIG. 6, for example, is configured as a substantially conical surface. This first surface 114 extends circumferentially about (e.g., completely around) the axial centerline 30, 82, 108. The first surface 114 extends axially along the axial centerline 30, 82, 108 from a leading end tip (e.g., forward, upstream point) of the center body 66 at the center body first end 110 to a (e.g., annular) leading edge 120 of the plateau surface 118. The first surface 114 flares (e.g., continuously or intermittently) radially away from the axial centerline 30, 82, 108 as the center body 66 and its surface 114 extend axially in an aft, downstream direction along the axial centerline 30, 82, 108 from the leading end tip towards (e.g., to) the plateau surface 118. The first surface 114 thereby tapers (e.g., continuously or intermittently) radially towards the axial centerline 30, 82, 108 as the center body 66 and its surface 114 extend axially in a forward, upstream direction along the axial centerline 30, 82, 108 from the plateau surface 118 towards (e.g., to) the leading end tip.

The second surface 116 may be a tapered and/or tubular surface. The second surface 116 of FIG. 6, for example, is configured as a substantially conical surface. This second surface 116 extends circumferentially about (e.g., completely around) the axial centerline 30, 82, 108. The second surface 116 extends axially along the axial centerline 30, 82, 108 from a trailing edge of the center body 66 at the center body second end 112 to a (e.g., annular) trailing edge 122 of the plateau surface 118. The second surface 116 tapers (e.g., continuously or intermittently) radially towards the axial centerline 30, 82, 108 as the center body 66 and its surface 116 extend axially in the aft, downstream direction along the axial centerline 30, 82, 108 from the plateau surface 118 towards (e.g., to) the center body trailing edge. The second surface 116 thereby flares (e.g., continuously or intermittently) radially away from the axial centerline 30, 82, 108 as the center body 66 and its surface 116 extend axially in the forward, upstream direction along the axial centerline 30, 82, 108 from the center body trailing edge towards (e.g., to) the plateau surface 118.

The plateau surface 118 may be an apex surface of the center body 66. The plateau surface 118 of FIG. 6, for example, is configured as a substantially cylindrical surface. This plateau surface 118 extends circumferentially about (e.g., completely around) the axial centerline 30, 82, 108. The plateau surface 118 extends axially along the axial centerline 30, 82, 108 from the plateau surface leading edge 120 to the plateau surface trailing edge 122. A flat plane 124 defined by at least three points along (or an entirety of) the plateau surface leading edge 120 is angularly offset from the axial centerline 30, 82, 108 by a first angle 126; e.g., a right angle. A flat plane 128 defined by at least three points along (or an entirety of) the plateau surface trailing edge 122 is angularly offset from the axial centerline 30, 82, 108 by a second angle 130; e.g., an acute angle. The second angle 130 of FIG. 6 is different (e.g., less) than the first angle 126. The plateau surface trailing edge plane 128 of FIG. 6 is thereby angularly offset from the plateau surface leading edge plane 124. The plateau surface trailing edge plane 128 may (or may not) be parallel with the inlet structure leading edge plane 94 (see FIG. 1). Thus, the plateau surface trailing edge plane 128 may have a scarfed configuration.

A first point 132 (e.g., one of the at least three points) on the plateau surface trailing edge 122 is axially displaced from a second point 134 (e.g., another one of the at least three points) on the plateau surface trailing edge 122 by a non-zero axial distance 136. The first point 132 of FIG. 6 may be a forwardmost, upstream-most point along the trailing edge 122 located at, for example, the gravitational top of the aircraft propulsion system 20 during the first (e.g., supersonic) mode of operation. The second point 134 of FIG. 6 may be an aftmost, downstream-most point along the trailing edge 122 and/or diametrically opposed to the first point 132 located at, for example, the gravitational bottom of the aircraft propulsion system 20 during the first (e.g., supersonic) mode of operation. The present disclosure, however, is not limited to such an exemplary inlet lip configuration. For example, in other embodiments, the first point 132 and/or the second point 134 may be respectively located along opposing sides of the center body 66 during the first (e.g., supersonic) mode of operation. Furthermore, while the first point 132 may be the only forwardmost, upstream-most point along the plateau surface trailing edge 122 and/or the second point 134 may be the only aftmost, downstream-most point along the plateau surface trailing edge 122, the present disclosure is not limited to such an exemplary configuration. The plateau surface leading edge 120, for example, may alternatively have an undulating (e.g., wavy) geometry.

The plateau surface 118 has an axial length 138. This plateau surface axial length 138 (e.g., continuously or intermittently) changes as the plateau surface 118 extends circumferentially about (e.g., completely around) the axial centerline 30, 82, 108. The plateau surface axial length 138 may have a first (e.g., maximum) value at the first point 132. The plateau surface axial length 138 may have a second (e.g., minimum) value at the second point 134, which second value is different (e.g., less) than the first value.

Figure 2:
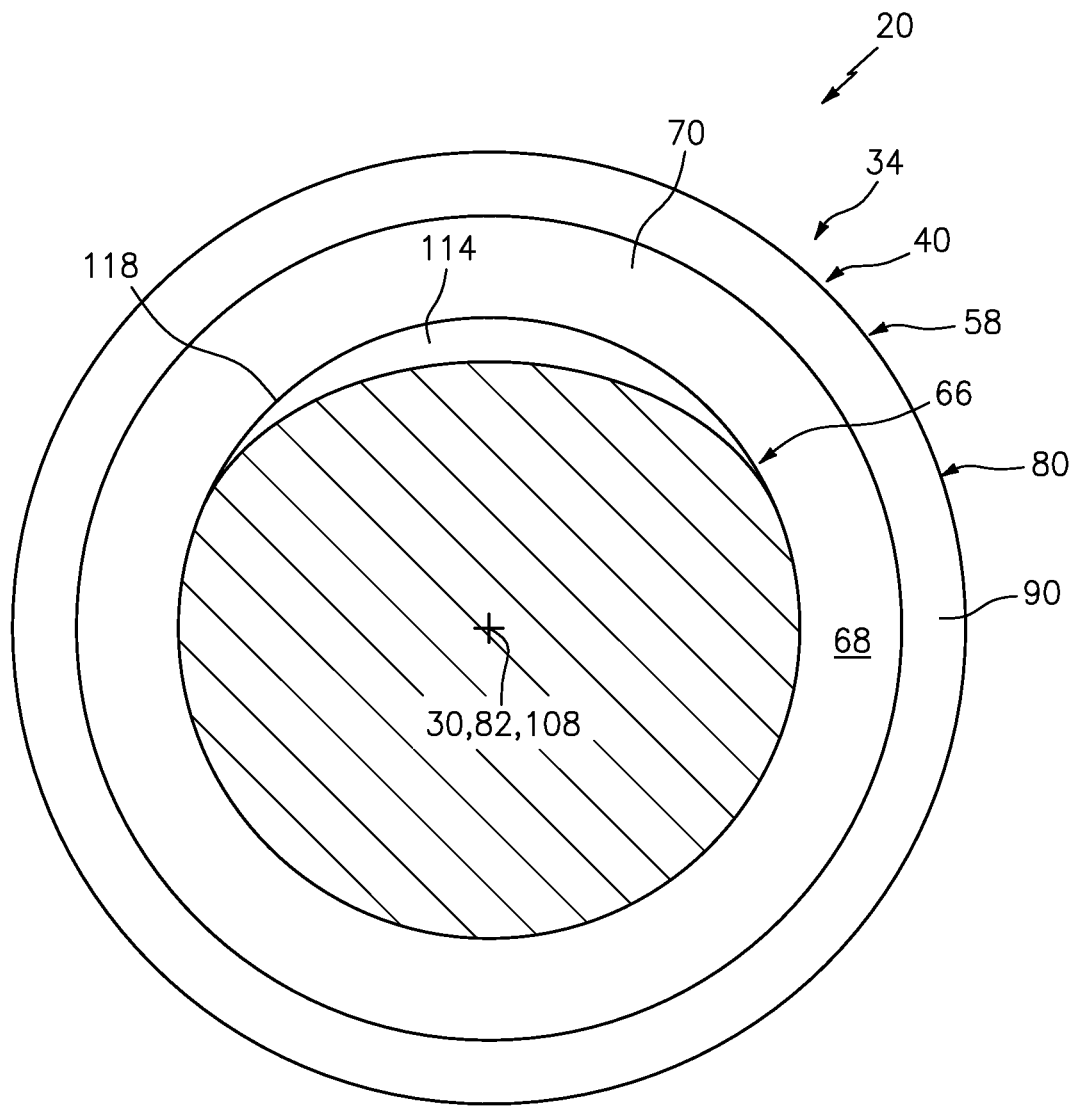
FIG. 2 is a cross-sectional illustration of the variable area inlet assembly in the first position taken along line 2-2 in FIG. 1.

The center body 66 of FIGS. 1 and 2 is arranged within the nacelle inlet structure 58 and projects axially through the inlet orifice 70. The center body 66 at least partially (or completely) forms an inner peripheral boundary of the inlet passage 68. The plateau surface 118 is axially aligned with the inlet lip 80.

Figure 7:
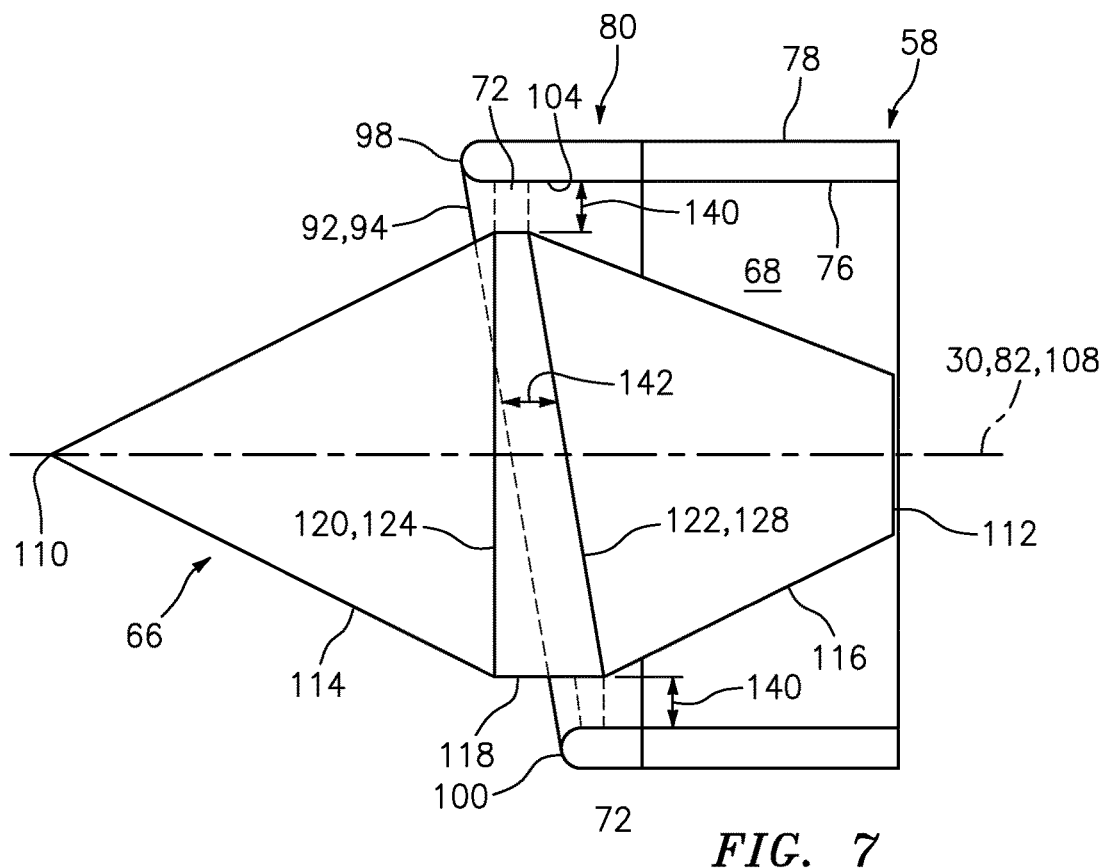
FIG. 7 is a side sectional illustration of the variable area inlet assembly in the first position.
Figure 8:
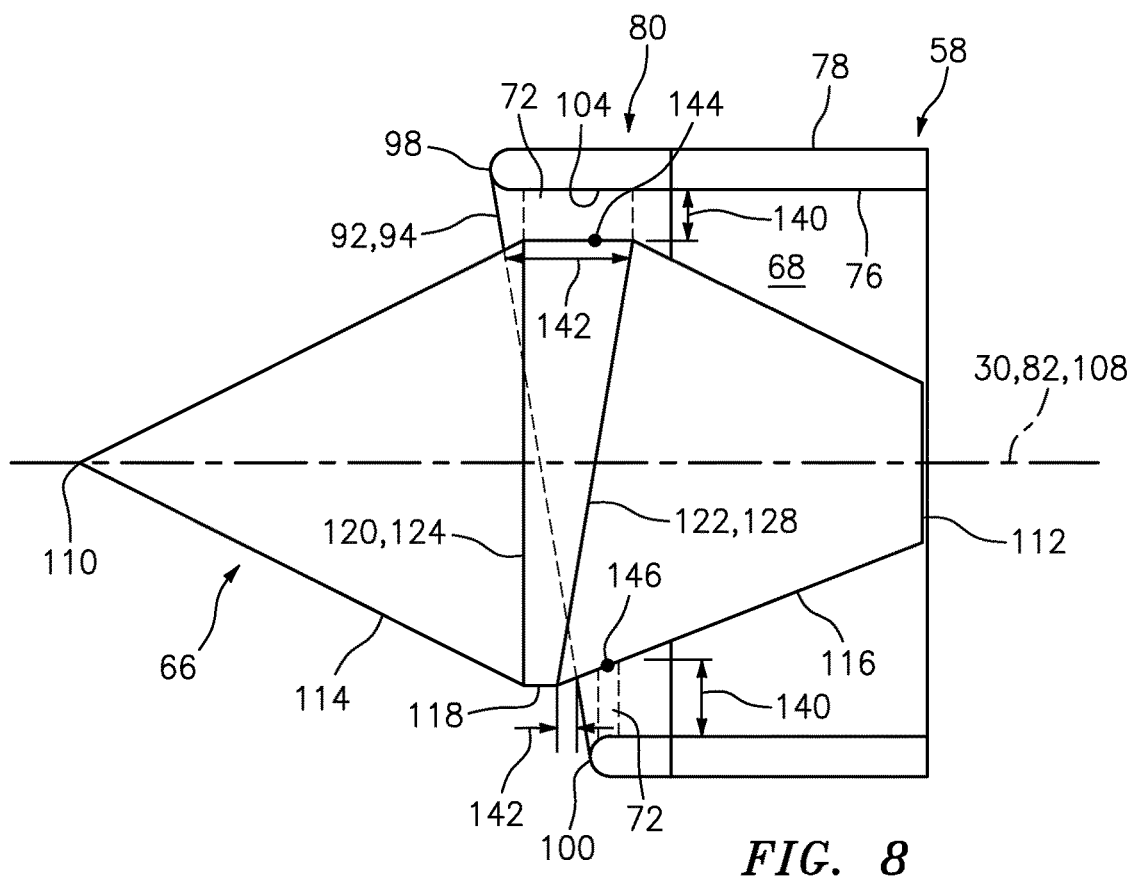
FIG. 8 is a side sectional illustration of the variable area inlet assembly in the second position.

The center body 66 may be configured to rotate (e.g., clockwise or counter-clockwise) about the axial centerline 30, 82, 108 between the first position (see FIG. 7) and the second position (see FIG. 8). The center body 66, for example, may be rotationally supported by one or more bearing structures, track assemblies and/or other suitable slidable/movable/pivotable connectors (not shown).

In the first position of FIG. 7, an inner peripheral boundary of the metering portion 72 is (e.g., completely) formed by the plateau surface 118. In this position, a minimum distance 140 between the inlet lip 80 and the center body 66 and, more particularly, between the inner lip portion 104 and the plateau surface 118 may be at least substantially or completely equal/uniform about the axial centerline 30, 82, 108. An axial distance 142 between the nacelle leading edge 92 and the plateau surface trailing edge 122 may also or alternatively be at least substantially or completely equal/uniform about the axial centerline 30, 82, 108.

In the second position of FIG. 8, the inner peripheral boundary of the metering portion 72 is formed by at least (or only) a portion of the plateau surface 118 and a portion of the second surface 116. In this position, the minimum distance 140 may (e.g., continuously or intermittently) change about the axial centerline 30, 82, 108. For example, the minimum distance 140 at a first point 144 along the metering portion 72 may be different (e.g., less) than the minimum distance at a second point 146 along the metering portion 72. The first point 144 of FIG. 8 may be at the gravitational top of the aircraft propulsion system 20. The second point 146 of FIG. 8 may be diametrically opposed to the first point 144 and/or at the gravitational bottom of the aircraft propulsion system 20. The minimum distance 140 at the first point 144 may be equal to the minimum distance 140 when the center body 66 is in the first position of FIG. 7. The axial distance 142 between the nacelle leading edge 92 and the plateau surface trailing edge 122 may also or alternatively (e.g., continuously or intermittently) change about the axial centerline 30, 82, 108. For example, the axial distance 142 at the first point 144 may be different (e.g., greater) than the axial distance 142 at the second point 146. With the foregoing arrangement, the second area 74B of the metering portion 72 (see FIG. 4) is different (e.g., greater) than the first area 74A of the metering portion 72 (see FIG. 3).

Figure 9:
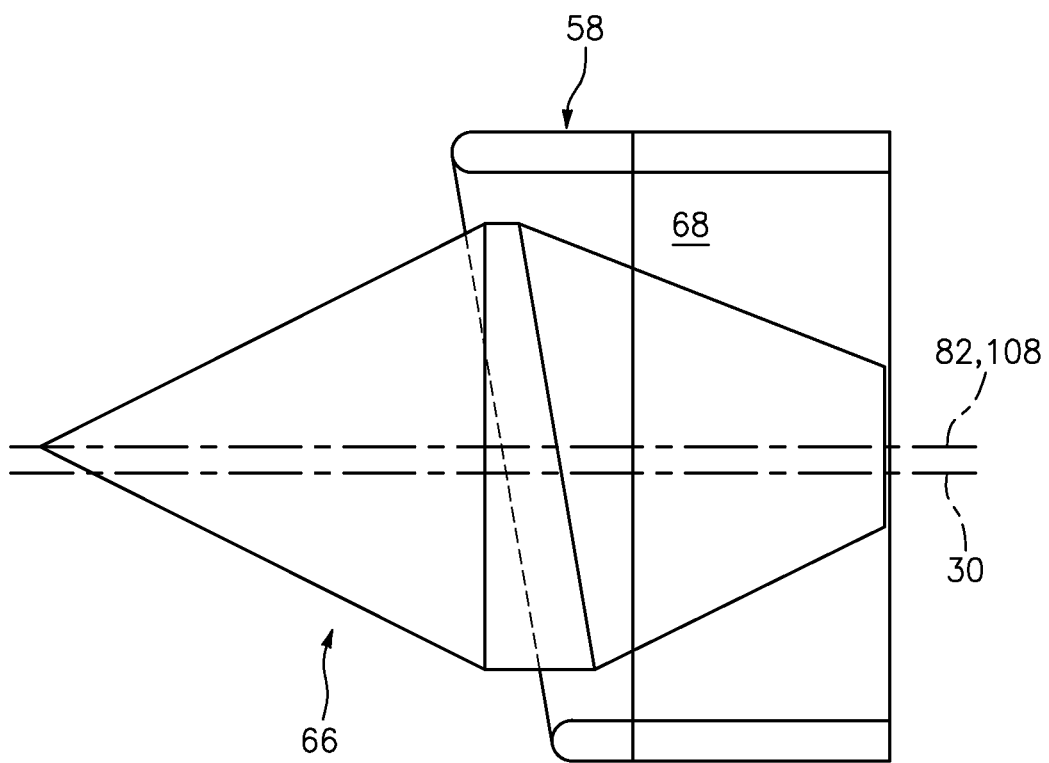
FIG. 9 is a side sectional illustration of another variable area inlet assembly.

In some embodiments, the axial centerline/rotational axis 108 of the center body 66 is coaxial with the axial centerline/rotational axis 30 of the aircraft propulsion system 20 and its gas turbine engine 22 as described above. However, in other embodiments, the axial centerline/rotational axis 108 of the center body 66 may be eccentric/non-coaxial with the axial centerline/rotational axis 30 of the aircraft propulsion system 20 and its gas turbine engine 22 as shown in FIG. 9. More particularly, the axial centerline 108 may be displaced from and/or angularly offset from the axial centerline 30.

In some embodiments, referring to FIGS. 7 and 8, the center body 66 may rotate one-hundred and eighty degrees (180°) between the first position of FIG. 7 and the second position of FIG. 8. However, in other embodiments, the center body 66 may rotate more than hundred and eighty degrees (e.g., between hundred and eighty degrees (180°) and two-hundred and seventy degrees (270°)) between the first and the second positions. In still other embodiments, the center body 66 may rotate less than hundred and eighty degrees (e.g., between ninety degrees (90°) and hundred and eighty degrees (180°)) between the first and the second positions.

In some embodiments, the center body 66 may be actuated by a gear drive system. In other embodiments, the center body 66 may be actuated by one or more other types of actuators such as, but not limited to, one or more worm and gear arrangements and/or one or more linear actuators arranged around a periphery of the center body 66.

The center body 66 is described above as a movable structure, and the nacelle inlet structure 58 is described above as a stationary structure. However, it is contemplated that the functionality/operation of these structures 58 and 66 may be reversed. For example, in some embodiments, the center body 66 may be configured as a stationary structure, and the nacelle inlet structure 58 and/or its inlet lip 80 may be configured as a movable structure; e.g., a rotatable structure. The nacelle inlet structure 58 and/or its inlet lip 80 may thereby move (e.g., rotate clockwise or counter-clockwise about the centerline 30, 82, 108) between the first and the second positions to increase or decrease the area of the metering portion 72.

The aircraft propulsion system 20 and its variable area inlet assembly 64 may be configured with various gas turbine engines other than the one described above. The gas turbine engine 22, for example, may be configured as a geared or a direct drive turbine engine. The gas turbine engine 22 may be configured with a single spool, with two spools (e.g., see FIG. 1), or with more than two spools. The gas turbine engine 22 may be configured as a turbofan engine, a turbojet engine or any other type of turbine engine. The present invention therefore is not limited to any particular types or configurations of gas turbine engines. The present disclosure is also not limited to applications where the aircraft is capable to traveling supersonic speeds.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    a center body;
    a scarfed inlet structure extending circumferentially about the center body; and
    an inlet passage radially between and formed by at least the center body and the scarfed inlet structure, the inlet passage comprising a metering portion;
    a first component of the assembly configured to rotate about an axis relative to a second component of the assembly between
        a first position where the metering portion has a first area; and
        a second position where the metering portion has a second area that is different than the first area;
    wherein the first component of the assembly comprises one of the center body or the scarfed inlet structure, and the second component of the assembly comprises the other one of the center body or the scarfed inlet structure;
    wherein the center body includes a first tapered surface, a second tapered surface and a plateau surface that extends axially between the first tapered surface and the second tapered surface;
    wherein the metering portion has an inner peripheral boundary;
    wherein the inner peripheral boundary is formed by the plateau surface when the first component of the assembly is in the first position; and
    wherein the inner peripheral boundary is formed by the plateau surface and the second tapered surface when the first component of the assembly is in the second position.

2. The assembly of claim 1, wherein the first component of the assembly comprises the center body, and the second component of the assembly comprises the scarfed inlet structure.

3. The assembly of claim 1, wherein
    the scarfed inlet structure has a leading edge; and
    a first point on the leading edge is axially displaced from a second point on the leading edge along the axis.

4. The assembly of claim 1, wherein a plane of an inlet orifice to the inlet opening passage is angularly offset from the axis.

5. The assembly of claim 1, wherein the first tapered surface is a tubular surface that radially tapers as the center body extends in a forward direction along the axis.

6. The assembly of claim 1, wherein the second tapered surface is a tubular surface that radially tapers as the center body extends in an aft direction along the axis.

7. The assembly of claim 1, wherein
    the plateau surface is aligned with an inlet lip of the scarfed inlet structure; and a trailing edge of the plateau surface has a scarfed configuration.

8. The assembly of claim 1, wherein
the plateau surface has a trailing edge; and
a first point on the trailing edge is axially displaced from a second point on the trailing edge along the axis.

9. The assembly of claim 1, wherein
the scarfed inlet structure comprises a leading edge;
the plateau surface has a trailing edge;
the trailing edge is separated from the leading edge by a first axial distance along the axis when the first component of the assembly is in the first position; and
the trailing edge is separated from the leading edge by a second axial distance along the axis when the first component of the assembly is in the second position, and the second axial distance is different than the first axial distance.

10. The assembly of claim 1, wherein the plateau surface is a cylindrical surface with an axial length that changes as the cylindrical surface extends circumferentially about the axis.

11. The assembly of claim 1, wherein the axis is coaxial with a centerline of the aircraft propulsion system.

12. The assembly of claim 1, wherein the axis is offset from a centerline of the aircraft propulsion system.

13. An assembly for an aircraft propulsion system, comprising:
a center body;
a scarfed inlet structure circumscribing the center body; and
an inlet passage radially between the center body and the scarfed inlet structure, the inlet passage comprising a metering portion;
the center body configured to rotate about an axis relative to the inlet structure between a first position where the metering portion has a first area; and
a second position where the metering portion has a second area that is different than the first area;
the center body including a first tapered surface, a second tapered surface and a plateau surface axially between the first tapered surface and the second tapered surface;
the metering portion having an inner peripheral boundary;
the inner peripheral boundary formed by the plateau surface when the center body is in the first position; and
the inner peripheral boundary formed by the plateau surface and the second tapered surface when the center body is in the second position.

14. The assembly of claim 13, wherein
the scarfed inlet structure has a leading edge; and
a first point on the leading edge is axially displaced from a second point on the leading edge along the axis.

15. The assembly of claim 13, wherein a plane of an inlet orifice to the inlet opening passage is angularly offset from the axis.

16. The assembly of claim 13, wherein the first tapered surface is a tubular surface that radially tapers as the center body extends in a forward direction along the axis.

17. The assembly of claim 13, wherein the second tapered surface is a tubular surface that radially tapers as the center body extends in an aft direction along the axis.

18. The assembly of claim 13, wherein
the plateau surface is aligned with an inlet lip of the scarfed inlet structure; and
a trailing edge of the plateau surface has a scarfed configuration.

19. The assembly of claim 13, wherein
the plateau surface has a trailing edge; and
a first point on the trailing edge is axially displaced from a second point on the trailing edge along the axis.

* * * * *